US012683647B2

(12) United States Patent
Ichioka et al.

(10) Patent No.: US 12,683,647 B2
(45) Date of Patent: Jul. 14, 2026

(54) DRIVER CIRCUIT, TRANSMITTER, AND COMMUNICATION SYSTEM

(71) Applicant: Socionext Inc., Kanagawa (JP)

(72) Inventors: Masatomo Ichioka, Yokohama (JP); Osamu Ninomiya, Yokohama (JP)

(73) Assignee: Socionext Inc., Kanagawa (JP)

( * ) Notice: Subject to any disclaimer, the term of this patent is extended or adjusted under 35 U.S.C. 154(b) by 394 days.

(21) Appl. No.: 18/517,644

(22) Filed: Nov. 22, 2023

(65) Prior Publication Data

US 2024/0097735 A1     Mar. 21, 2024

Related U.S. Application Data

(63) Continuation of application No. PCT/JP2021/019825, filed on May 25, 2021.

(51) Int. Cl.
H04B 1/04 (2006.01)
H04B 1/48 (2006.01)
H04B 1/50 (2006.01)

(52) U.S. Cl.
CPC ................ H04B 1/48 (2013.01); H04B 1/50 (2013.01)

(58) Field of Classification Search
CPC .......... H04B 1/02; H04B 1/04; H04B 1/0466; H04B 1/0483; H04B 1/48; H04B 10/564
See application file for complete search history.

(56) References Cited

U.S. PATENT DOCUMENTS

| | | |
|---|---|---|
| 9,843,324 B1 | 12/2017 | Hafizi et al. |
| 2011/0096848 A1 | 4/2011 | Lam et al. |
| 2011/0193595 A1 | 8/2011 | Fukuda et al. |
| 2012/0250199 A1* | 10/2012 | Woo ......................... H04B 3/44 |
| | | 361/56 |
| 2012/0307122 A1* | 12/2012 | Liu ..................... H03F 3/45654 |
| | | 348/332 |
| 2014/0103890 A1 | 4/2014 | Naidu et al. |
| 2015/0116045 A1* | 4/2015 | Itasaka ..................... H03B 5/04 |
| | | 29/25.35 |
| 2015/0186091 A1 | 7/2015 | Kumar et al. |
| 2018/0005597 A1* | 1/2018 | Kumar ................... G09G 5/006 |

(Continued)

FOREIGN PATENT DOCUMENTS

| | | |
|---|---|---|
| JP | 2002-258957 A | 9/2002 |
| JP | 2011-166260 A | 8/2011 |

(Continued)

OTHER PUBLICATIONS

Japanese Office Action dated Jan. 14, 2024 issued in the corresponding Japanese Patent Application No. 2023-523765, with partial English translation.

(Continued)

*Primary Examiner* — Tuan Pham
(74) *Attorney, Agent, or Firm* — Rimon P.C.

(57)     ABSTRACT

A first driver operates with a first power supply and outputs a signal in response to a first input signal. A regulator receives a second power supply lower in voltage than the first power supply and provides a third power supply lower in voltage than the second power supply. A second driver operates with the third power supply and outputs a signal in response to a second input signal. The output of the first driver and the output of the second driver are connected in common to an output terminal.

5 Claims, 3 Drawing Sheets

(56)　　　　　　References Cited

U.S. PATENT DOCUMENTS

| | | |
|---|---|---|
| 2019/0214994 A1 | 7/2019 | Kihara |
| 2019/0237012 A1 | 8/2019 | Ichikura et al. |
| 2020/0184891 A1 | 6/2020 | Ichikura et al. |

FOREIGN PATENT DOCUMENTS

| | | |
|---|---|---|
| JP | 2015-091092 A | 5/2015 |
| JP | 2015-195435 A | 11/2015 |
| JP | 2019-132918 A | 8/2019 |
| JP | 2020-043523 A | 4/2020 |
| WO | 2018/070261 A1 | 4/2018 |

OTHER PUBLICATIONS

International Search Report dated Jul. 6, 2021 issued in International Patent Application No. PCT/JP2021/019825, with English translation.

* cited by examiner

DRIVER CIRCUIT, TRANSMITTER, AND COMMUNICATION SYSTEM

CROSS-REFERENCE TO RELATED APPLICATIONS

This is a continuation of International Application No. PCT/JP2021/019825 filed on May 25, 2021. The entire disclosure of this application is incorporated by reference herein.

BACKGROUND

The present disclosure relates to a driver circuit used in a communication system.

In a communication system, communications are sometimes performed by connecting devices that transmit and receive signals conforming to a predetermined standard. MIPI D-PHY is one of such communication standards, which includes a low-speed low-power signal transmission mode (LPTX mode) and a high-speed small-amplitude signal transmission mode (HSTX mode). In the MIPI D-PHY standard, the LPTX mode and the HSTX mode are combined at a given ratio, to achieve a high-speed low-power interface. Note however that when the operation ratio of the HSTX mode to the LPTX mode is high, power consumption becomes large and therefore further power reduction is required.

Japanese Unexamined Patent Publication No. 2020-43523 discloses a configuration in which, in a communication system, the operation of a driver circuit is switched from one to another depending on the range of the power supply voltage so that wired communication can be performed properly.

When the configuration of the cited patent document is applied to the MIPI D-PHY in which the LPTX mode is indispensable, it is necessary to give a power supply voltage equal to or higher than the voltage of the signal amplitude in the LPTX mode (e.g., 1.2 V) to a regulator that supplies power to the driver circuit. On the other hand, in the HSTX mode, in which a fixed DC current is passed to the output for obtaining a desired output amplitude, an amount of power corresponding to the product of this DC current and the power supply voltage given to the regulator will be consumed. This raises a problem that the power consumption in the HSTX mode will be large.

Also, in the configuration of the cited patent document, in order to comply with the LPTX mode, the driver circuit is required to use high withstand-voltage transistors. This makes power reduction more difficult.

An objective of the present disclosure is achieving power reduction in a driver circuit having two signal transmission modes different in amplitude, such as the LPTX mode and the HSTX mode.

SUMMARY

According to the first mode of the present disclosure, a driver circuit includes: a first driver provided between a first power supply of a first voltage and a ground power supply, the first driver receiving a first input signal and outputting a signal responsive to the first input signal; a regulator connected to a second power supply of a second voltage lower than the first voltage, the regulator providing a third power supply of a third voltage lower than the second voltage; a second driver provided between the third power supply and the ground power supply, the second driver receiving a second input signal and outputting a signal responsive to the second input signal; and an output terminal connected in common to the output of the first driver and the output of the second driver.

According to the above mode, the first driver operates with the first power supply and outputs a signal responsive to the first input signal. The regulator receives the second power supply lower in voltage than the first power supply and provides the third power supply lower in voltage than the second power supply. The second driver operates with the third power supply and outputs a signal responsive to the second input signal. The output of the first driver and the output of the second driver are connected in common to the output terminal. That is, the first driver and the second driver are provided in parallel to each other, and the power supply voltage of the regulator that supplies power to the second driver is lower than the power supply voltage of the first driver. Therefore, in the mode in which the second driver operates, the power consumption in a current path from the power supply for the regulator through the driver circuit is small, whereby power reduction of the driver circuit can be achieved.

According to the second mode of the present disclosure, a driver circuit includes: a first driver provided between a first power supply of a first voltage and a ground power supply, the first driver receiving a first input signal and outputting a signal responsive to the first input signal; a regulator connected to a second power supply of a second voltage lower than the first voltage, the regulator providing a third power supply of a third voltage lower than the second voltage; a second driver provided between the third power supply and the ground power supply, the second driver receiving a second input signal and outputting a signal responsive to the second input signal; an output terminal connected in common to the output of the first driver and the output of the second driver; and an electrostatic discharge (ESD) protection circuit including one diode or two or more serially connected diodes, provided between the second power supply and the output terminal.

According to the above mode, advantages similar to those described above in the first mode is obtained. In addition, the ESD protection circuit including one diode or two or more serially connected diodes is provided between the second power supply and the output terminal. With this, the driver circuit can be protected from ESD.

According to the third mode of the present disclosure, a driver circuit includes: a first driver provided between a first power supply of a first voltage and a ground power supply, the first driver receiving a first input signal and outputting a signal responsive to the first input signal; a regulator connected to a second power supply of a second voltage lower than the first voltage, the regulator providing a third power supply of a third voltage lower than the second voltage; a second driver provided between the third power supply and the ground power supply, the second driver receiving a second input signal and outputting a signal responsive to the second input signal; an output terminal connected in common to the output of the first driver and the output of the second driver; and an anti-load fluctuation circuit for preventing or reducing fluctuations in the third voltage of the third power supply at a time of transition from a first mode in which the first driver operates to a second mode in which the second driver operates, wherein the anti-load fluctuation circuit includes a current route provided between the third power supply and the ground power supply, the current route being switched between a conductive state and a non-conductive state in response to a given signal, and in the case of transition from the first mode to the second mode, the anti-load fluctuation circuit is configured to give a signal to the current route so as to bring the current route to the conductive state while the mode is in the first mode and, at the time of transition to the second mode, bring the current route to the cut-off state.

According to the above mode, advantages similar to those described above in the first mode is obtained. In addition, with the anti-load fluctuation circuit, fluctuations in the third power supply voltage can be prevented or reduced in the case of transition from the first mode in which the first driver operates to the second mode in which the second driver operates.

According to the present disclosure, power reduction can be achieved in a driver circuit having two signal transmission modes different in amplitude.

BRIEF DESCRIPTION OF THE DRAWINGS

FIGS. 3A-3B are signal waveform diagrams at the time of switching from the LPTX mode to the HSTX mode, in which FIG. 3A shows the case of having no anti-load fluctuation circuit and FIG. 3B shows the case of having an anti-load fluctuation circuit.

DETAILED DESCRIPTION

An embodiment of the present disclosure will be described hereinafter with reference to the accompanying drawings. Note that the circuit configuration diagram to be described later is a simplified illustration focusing on components related to the present disclosure. In some cases, therefore, components illustrated as directly connected in the diagram may actually be connected indirectly have another component interposed between them.

In the following description, a signal being "high" or "low", or "1" or "0" indicates that the signal is in a high potential-side or low potential-side logical level. Also, a transistor being "on" or "off" indicates whether the transistor is in the conductive state or in the non-conductive state. Note that symbols "VDE", "VDN", "VREG", "VSS", and the like are used to represent both power supplies themselves and power supply potentials. Also, symbols "R1" and the like are used to represent both resistive elements themselves and the resistance values of the resistive elements.

Figure 1:
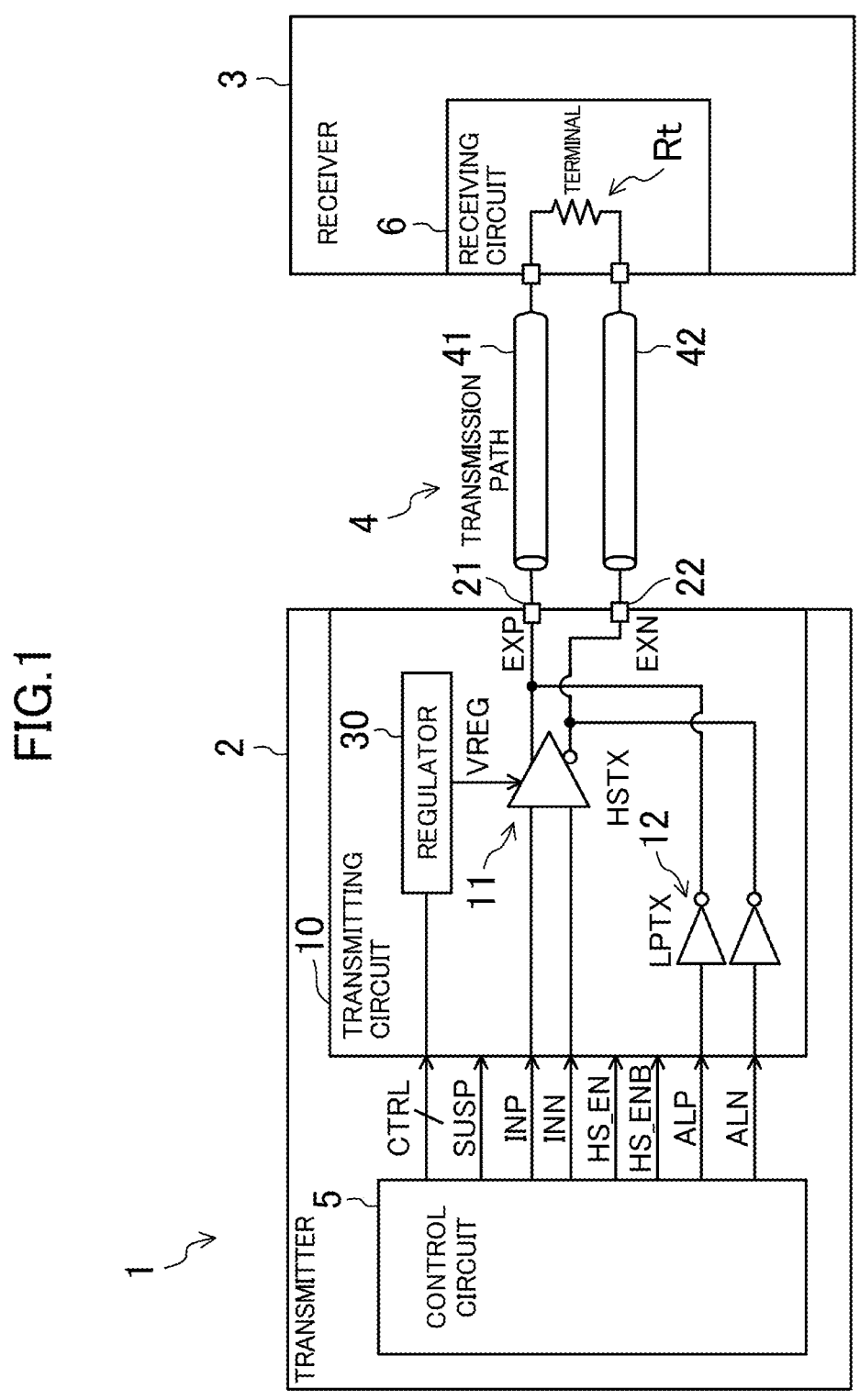
FIG. 1 shows a configuration example of a communication system.

FIG. 1 shows an overview of a configuration example of a communication system. A communication system 1 of FIG. 1 includes a transmitter 2, a receiver 3, and a transmission path 4. The transmitter 2 includes a transmitting circuit 10 and a control circuit 5 that controls the transmitting circuit 10. The receiver 3 includes a receiving circuit 6 having a terminal resistor Rt. The terminal resistor Rt is 100Ω, for example. The transmission path 4, configured to be able to transmit a differential signal pair, has a p-side transmission line 41 and an n-side transmission line 42. Output terminals 21 and 22 of the transmitting circuit 10 are respectively connected to the p-side transmission line 41 and the n-side transmission line 42 of the transmission path 4. The communication system 1 is assumed hereto conform to the MIPI D-PHY standard. As described earlier, in the MIPI D-PHY standard, the LPTX mode and the HSTX mode are combined to achieve a high-speed low-power interface.

The transmitting circuit 10 includes a high-speed driver (HSTX) 11, a low-speed driver (LPTX) 12, and a regulator 30. The outputs of the high-speed driver 11 and the outputs of the low-speed driver 12 are connected in common to the output terminals 21 and 22 of the transmitting circuit 10. The regulator 30, receiving a control signal CTRL from the control circuit 5, generates a power supply voltage VREG and supplies the voltage to the high-speed driver 11. The high-speed driver 11, receiving a differential signal pair INP and INN from the control circuit 5, generates signals EXP and EXN to be output to the transmission path 4. The low-speed driver 12, receiving single-ended signals ALP and ALN from the control circuit 5, generates signals EXP and EXN to be output to the transmission path 4. The transmitting circuit 10 is an example of the driver circuit according to the present disclosure: the high-speed driver 11 corresponds to the second driver and the low-speed driver 12 corresponds to the first driver.

Signals HS_EN and HS_ENB are signals for switching between the HSTX mode and the LPTX mode, and are complementary signals. When the signal HS_EN is high and the signal HS_ENB is low, the transmitting circuit 10 operates as the HSTX mode. In the HSTX mode, the high-speed driver 11 operates. When the signal HS_EN is low and the signal HS_ENB is high, the transmitting circuit 10 operates as the LPTX mode. In the LPTX mode, the low-speed driver 12 operates. A signal SUSP is a signal used for control of an anti-load fluctuation circuit 40 to be described later.

Figure 2:
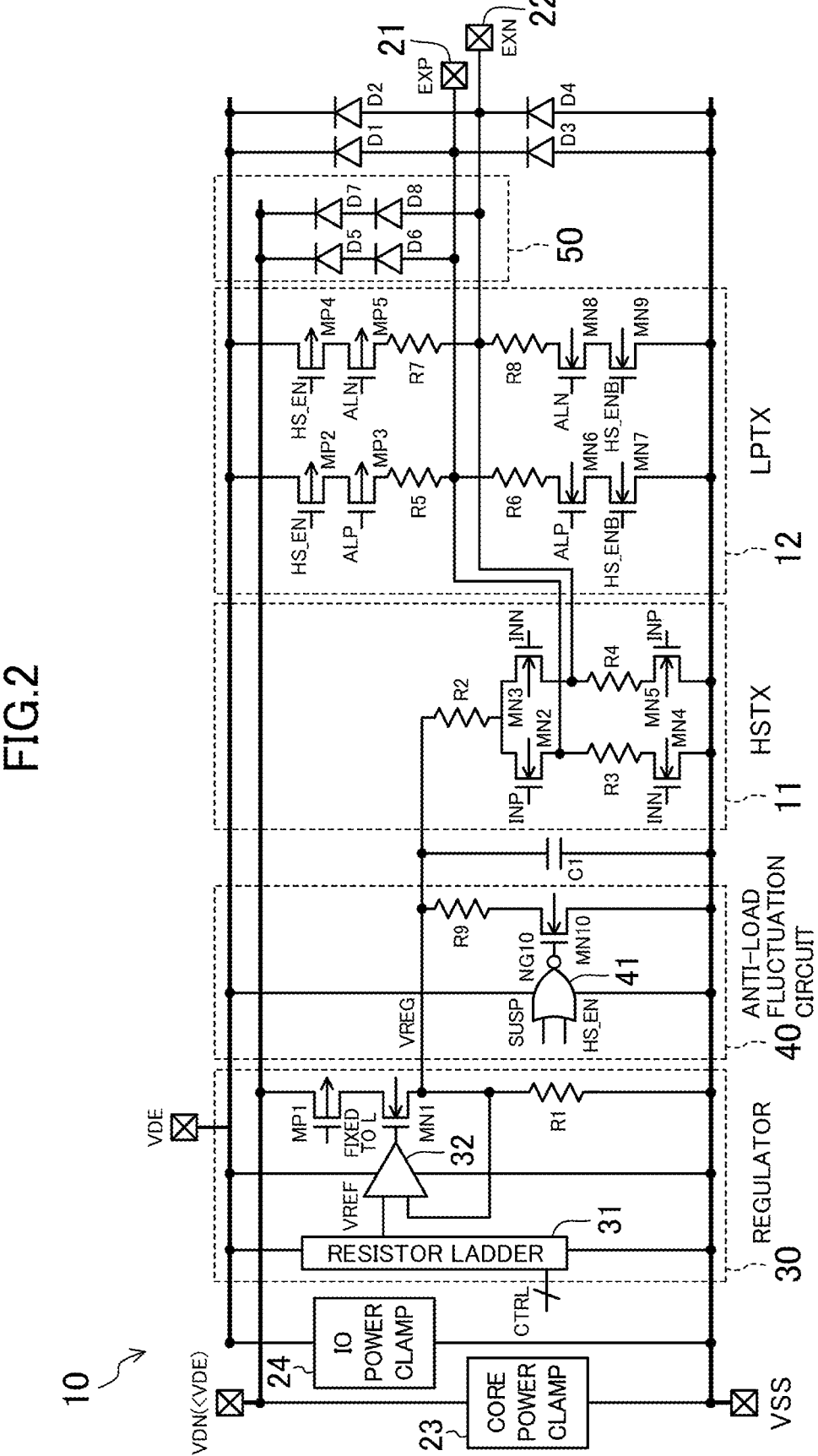
FIG. 2 shows a circuit configuration example of a transmitting circuit as an example of a driver circuit according to an embodiment.

FIG. 2 is a view showing a circuit configuration example of the transmitting circuit 10. The transmitting circuit 10 of FIG. 2 includes VDE and VDN as power supplies. The power supply voltage VDN is lower than the power supply voltage VDE (VDN<VDE): e.g., VDE is 1.2 V and VDN is 0.75 V. For example, VDN is a core power supply and VDE is an IO power supply. For electrostatic discharge (ESD) protection, a core power clamp circuit 23 is provided between the power supply VDN and a ground power supply VSS, and an IO power clamp circuit 24 is provided between the power supply VDE and the ground power supply VSS.

The regulator 30 generates, from the power supply VDN, power VREG with which the high-speed driver 11 operates. The regulator 30 includes a resistor ladder 31, an operational amplifier 32, a p-type transistor MP1, an n-type transistor MN1, and a resistive element R1. The resistor ladder 31 performs resistance voltage division for the power supply voltage VDE to generate a reference voltage VREF. The resistor ladder 31 has a function of adjusting the reference voltage VREF putting its center on 0.4 V or 0.2 V, for example, according to the control signal CTRL. The p-type transistor MP1, the n-type transistor MN1, and the resistive element R1 are connected in series between the power supply VDN and the power supply VSS. The power supply voltage VREG is output from a connection node between the n-type transistor MN1 and the resistive element R1. The operational amplifier 32 receives the reference voltage VREF at one of its inputs and the fed-back power supply voltage VREG at the other input, and is connected to the gate of the n-type transistor MN1 at its output. With this, the power supply voltage VREG is set to 0.4 V or 0.2 V, for example, in response to the reference voltage VREF. The p-type transistor MP1 is provided for circuit protection, with its gate being fixed to low (0 V).

The high-speed driver 11 includes n-type transistors MN2, MN3, MN4, and MN5 and resistive elements R2, R3, and R4. The resistive element R2 is connected to the power supply VREG at one end. Between the other end of the resistive element R2 and the ground power supply VSS, the n-type transistor MN2, the resistive element R3, and the n-type transistor MN4 are connected in series, and also, in parallel with these, the n-type transistor MN3, the resistive element R4, and the n-type transistor MN5 are connected in series. The signal INP is input into the gates of the n-type transistors MN2 and MN5, and the signal INN is input into the gates of the n-type transistors MN3 and MN4. A node between the n-type transistor MN2 and the resistive element R3 is connected to the output terminal 21, and the signal EXP is output from this node. A node between the n-type transistor MN3 and the resistive element R4 is connected to the output terminal 22, and the signal EXN is output from this node.

The low-speed driver 12 includes p-type transistors MP2, MP3, MP4, and MP5, n-type transistors MN6, MN7, MN8, and MN9, and resistive elements R5, R6, R7, and R8. The p-type transistors MP2 and MP3, the resistive elements R5 and R6, and the n-type transistors MN6 and MN7 are connected in series between the power supply VDE and the ground power supply VSS. Also, the p-type transistors MP4 and MP5, the resistive elements R7 and R8, and the n-type transistors MN8 and MN9 are connected in series between the power supply VDE and the ground power supply VSS. The signal ALP is input into the gates of the p-type transistor MP3 and the n-type transistor MN6, and the signal ALN is input into the gates of the p-type transistor MP5 and the n-type transistor MN8. Also, the signal HS_EN is input into the gates of the p-type transistors MP2 and MP4, and the signal HS_ENB is input into the gates of the n-type transistors MN7 and MN9. A node between the resistive elements R5 and R6 is connected to the output terminal 21, and the signal EXP is output from this node. A node between the resistive elements R7 and R8 is connected to the output terminal 22, and the signal EXN is output from this node.

<Operation in HSTX Mode>

When the signal HS_EN is high and the signal HS_ENB is low, the transmitting circuit 10 is in the HSTX mode in which the high-speed driver 11 operates. The low-speed driver 12 does not operate since the p-type transistors MP2 and MP4 and the n-type transistors MN7 and MN9 are off.

In the HSTX mode, in the high-speed driver 11, when the signal INP is high and the signal INN is low, the n-type transistors MN2 and MN5 are on and the n-type transistors MN3 and MN4 are off. At this time, the current flows from the power supply VREG to the resistive element R2→the n-type transistor MN2→the output terminal 21→the p-side transmission line 41→the terminal resistor Rt of the receiving circuit 6→the n-side transmission line 42→the output terminal 22→the resistive element R4→the n-type transistor MN5→the ground power supply VSS. On the other hand, when the signal INP is low and the signal INN is high, the n-type transistors MN3 and MN4 are on and the n-type transistors MN2 and MN5 are off. At this time, the current flows from the power supply VREG to the resistive element R2→the n-type transistor MN3→the output terminal 22→the n-side transmission line 42→the terminal resistor Rt of the receiving circuit 6→the p-side transmission line 41→the output terminal 21→the resistive element R3→the n-type transistor MN4→the ground power supply VSS.

Assume here that the circuit is designed so that the R2+MN2 on-resistance, the R2+MN3 on-resistance, the R3+MN4 on-resistance, and the R4+MN5 on-resistance are each 50Ω. In this case, the total resistance in the current route from the power supply VREG to the ground power supply VSS described above will be 200Ω including 100Ω of the terminal resistor Rt.

When the power supply voltage VREG is 0.4 V, the current flowing between VREG and VSS is 2 (=0.4×1000/200) mA. A differential voltage of 200 mV is output to the terminal resistor Rt. When the signal INP is high and the signal INN is low, the signal EXP is 300 mV and the signal EXN is 100 mV. When the signal INP is low and the signal INN is high, the signal EXP is 100 mV and the signal EXN is 300 mV. In either case, the differential common voltage is 200 mV.

Likewise, when the power supply voltage VREG is 0.2 V, the current flowing between VREG and VSS is 1 (=0.2×1000/200) mA. A differential voltage of 100 mV is output to the terminal resistor Rt, and the differential common voltage is 100 mV.

<Operation in LPTX Mode>

When the signal HS_EN is low and the signal HS_ENB is high, the transmitting circuit 10 is in the LPTX mode in which the low-speed driver 12 operates. The high-speed driver 11 does not operate since both the signals INP and INN are low.

In the LPTX mode, in the low-speed driver 12, when the signal ALP is high, the p-type transistor MP3 is off and the n-type transistor MN6 is on, so that the low level is output as the signal EXP. When the signal ALP is low, the p-type transistor MP3 is on and the n-type transistor MN6 is off, so that the high level is output as the signal EXP.

Also, in the low-speed driver 12, when the signal ALN is high, the p-type transistor MP5 is off and the n-type transistor MN8 is on, so that the low level is output as the signal EXN. When the signal ALN is low, the p-type transistor MP5 is on and the n-type transistor MN8 is off, so that the high level is output as the signal EXN.

(Other Configurations)

For ESD protection, diodes D1 and D2 are provided between the output terminals 21 and 22, respectively, and the power supply VDE, and diodes D3 and D4 are provided between the output terminals 21 and 22, respectively, and the ground power supply VSS.

Also, an ESD protection circuit 50 is provided between the power supply VDN and the output terminals 21 and 22. The ESD protection circuit 50 includes diodes D5 and D6 connected in series between the power supply VDN and the output terminal 21 and diodes D7 and D8 connected in series between the power supply VDN and the output terminal 22. In the ESD protection circuit 50, the serially connected diodes D5 and D6 and the serially connected diodes D7 and D8 are provided so as to avoid occurrence of a through-current in consideration of a voltage difference that may occur between the power supply VDN and the output terminals 21 and 22 and the threshold voltages of the diodes.

The anti-load fluctuation circuit 40 is provided to prevent or reduce fluctuations in the power supply voltage VREG at the time of switching from the LPTX mode to the HSTX mode. The anti-load fluctuation circuit 40 includes a NOR circuit 41, a resistive element R9, and an n-type transistor MN10. The resistive element R9 and the n-type transistor MN10 are connected in series between the power supply VREG and the ground power supply VSS. With this, a current route switched between the conductive state and the non-conductive state according to a signal given to the gate of the n-type transistor MN10 is formed between the power supply VREG and the ground power supply VSS. The NOR circuit 41 receives the signal HS_EN and the signal SUSP at its inputs and gives its output NG10 to the gate of the n-type transistor MN10.

Figures 3A, 3B:
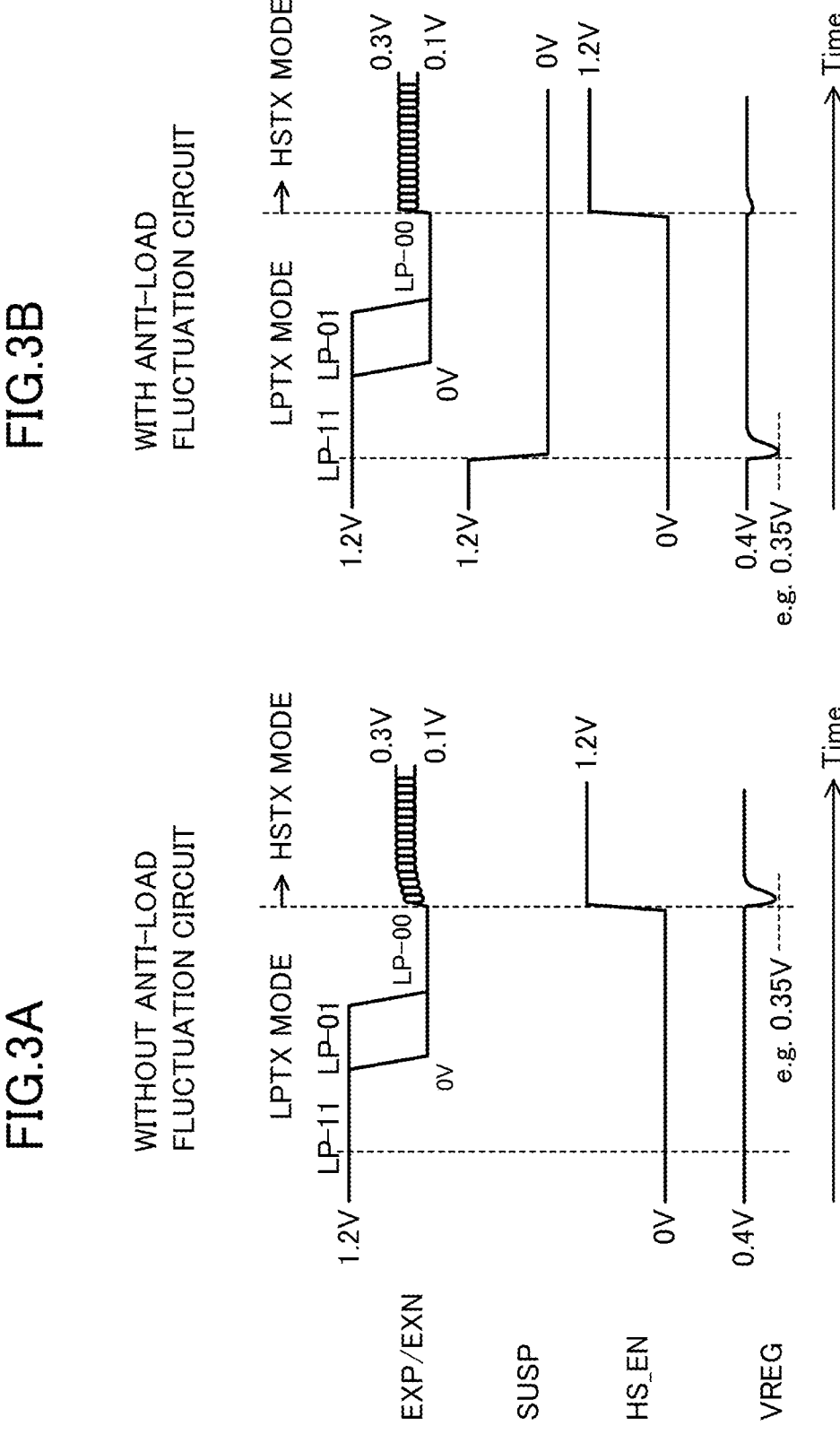

FIGS. 3A-3B are signal waveform diagrams showing the operation at the time of switching from the LPTX mode to the HSTX mode, in which FIG. 3A shows the case of having no anti-load fluctuation circuit and FIG. 3B shows the case of having the anti-load fluctuation circuit 40.

As shown in FIG. 3A, in the operation sequence of the MIPI D-PHY-Tx, the LPTX mode is switched to the HSTX mode after a series of transition of LP-11→LP-01→LP-00. At this time, the high-speed driver 11 sharply changes from the state of no current flowing in the VREG-VSS current route described above to the state where a current (e.g., 2 mA) flows. For this reason, the power supply voltage VREG fluctuates immediately after the transition to the HSTX mode, whereby the potentials of the signals EXP and EXN become unstable.

By contrast, when the anti-load fluctuation circuit 40 is provided, the operation is as shown in FIG. 3B. The signal SUSP, which is a signal newly provided for the anti-load fluctuation circuit 40, changes from high to low prior to the change of the signal HS_EN from low to high at the time of switching from the LPTX mode to the HSTX mode. Since this makes the output NG10 of the NOR circuit 41 high, a current is drawn from the power supply VREG through the resistive element R9 and the n-type transistor MN10. Once the signal HS_EN becomes high from low, the output NG10 of the NOR circuit 41 becomes low, shutting off the current route through the resistive element R9 and the n-type transistor MN10. As a result, the potentials of the signals EXP and EXN can be stabilized from immediately after the transition to the HSTX mode.

Also, a capacitive element C1 is provided between the power supply VREG and the ground power supply VSS. With the capacitive element C1, it is possible to reduce the impedance at the node of the power supply VREG and thus stabilize its potential, whereby the waveform quality of the output signals EXP and EXN of the high-speed driver 11 can be improved. The capacitive element C1 is preferably constituted by a varactor, for example, whereby a large-capacity stabilized capacitance can be implemented in a comparatively small area and under a low voltage.

The transmitting circuit 10 operates as follows as a whole. The regulator 30 supplies the power supply voltage VREG to the high-speed driver 11. When the signal HS_EN is high (the signal HS_ENB is low), the transmitting circuit 10 is in the HSTX mode, in which the high-speed driver 11 operates to output the differential small-amplitude signals EXP and EXN in response to the differential input signals INP and INN. At this time, the low-speed driver 12 is in the non-operating state, its output being Hi-Z. On the other hand, when the signal HS_EN is low (the signal HS_ENB is high), the transmitting circuit 10 is in the LPTX mode, in which the low-speed driver 12 operates to output the CMOS output signals EXP and EXN in response to the single-ended signals ALP and ALN. At this time, the high-speed driver 11 is in the non-operating state, its output being Hi-Z. That is, in the transmitting circuit 10, the high-speed driver 11 and the low-speed driver 12 operate exclusively.

As described above, in this embodiment, the transmitting circuit 10, having the high-speed driver 11 and the low-speed driver 12 provided in parallel, operates the high-speed driver 11 and the low-speed driver 12 exclusively by switching the operation between them. Therefore, the power supply VDN for the regulator 30 that supplies the power VREG to the high-speed driver 11 can be made lower in voltage than the power supply VDE for the low-speed driver 12. This permits power reduction of the transmitting circuit 10. Also, since the transistors MN2 to MN5 of the high-speed driver 11 can be constituted by low withstand-voltage transistors, power reduction is facilitated.

In addition, the ESD protection circuit 50 including the serially connected diodes D5 and D6 and the serially connected diodes D7 and D8 is provided for ESD protection between the power supply VDN and the output terminals 21 and 22. Note that, considering the potential difference between the power VDN and the signals EXP and EXN and the thresholds of the diodes, three or more stages of diodes may be provided, or one diode may be provided, as required.

Also, with the anti-load fluctuation circuit 40, it is possible to prevent or reduce fluctuations in the power supply voltage VREG at the time of switching from the LPTX mode to the HSTX mode. Moreover, with the capacitive element C1 made of a varactor provided between the power supply VREG and the ground power supply VSS, fluctuations in the power supply voltage VREG can be further reduced.

While the above embodiment was described using the transmitting circuit 10 conforming to the MIPI D-PHY standard having the LPTX mode and the HSTX mode as an example, the driver circuit according to the present disclosure is not limited to this. The present disclosure is applicable to a driver circuit having two signal transmission modes different in amplitude.

It should be noted that the present disclosure is not limited to the configurations presented in the above-described embodiment, but many variations are possible within the technical idea of the present disclosure by a person having ordinary skill in the art. Also, components in different embodiments may be arbitrarily combined without departing from the spirit and scope of the present disclosure.

According to the present disclosure, power reduction can be achieved in a driver circuit having two signal transmission modes different in amplitude. The present disclosure is therefore useful for power saving of a communication system.

The invention claimed is:

1. A driver circuit, comprising:

a first driver provided between a first power supply of a first voltage and a ground power supply, the first driver receiving a first input signal and outputting a signal responsive to the first input signal;

a regulator connected to a second power supply of a second voltage lower than the first voltage, the regulator providing a third power supply of a third voltage lower than the second voltage;

a second driver provided between the third power supply and the ground power supply, the second driver receiving a second input signal and outputting a signal responsive to the second input signal;

an output terminal connected in common to the output of the first driver and the output of the second driver; and an anti-load fluctuation circuit for preventing or reducing fluctuations in the third voltage of the third power supply at a time of transition from a first mode in which the first driver operates to a second mode in which the second driver operates, wherein the anti-load fluctuation circuit includes a current route provided between the third power supply and the ground power supply, the current route being switched between a conductive state and a non-conductive state in response to a given signal, and in the case of transition from the first mode to the second mode, the anti-load fluctuation circuit is configured to give a signal to the current route so as to bring the current route to the conductive state while the mode is in the first mode and, at the time of transition to the second mode, bring the current route to the cut-off state.

2. The driver circuit of claim 1, further comprising:

a capacitive element constituted by a varactor, provided between the third power supply and the ground power supply.

3. The driver circuit of claim 1, wherein the second driver includes a first resistive element connected to the third power supply at one end, a first n-type transistor, a second resistive element, and a second n-type transistor connected in series between the other end of the first resistive element and the ground power supply, and a third n-type transistor, a third resistive element, and a fourth n-type transistor connected in series between the other end of the first resistive element and the ground power supply, in parallel with the first n-type transistor, the second resistive element, and the second n-type transistor, and the second input signal is a differential signal pair, one of the signals of the differential signal pair is input into gates of the first and fourth n-type transistors, and the other signal is input into gates of the second and third n-type transistors.

4. A transmitter comprising the driver circuit of claim 1.

5. A communication system comprising:

the transmitter of claim 4;

a transmission path connected to the transmitter; and a receiver connected to the transmitter through the transmission path.

* * * * *